United States Patent [19]

Abbott

[11] Patent Number: 5,593,203
[45] Date of Patent: Jan. 14, 1997

[54] RETROFITTED DOOR FOR OPEN LUGGAGE RACK ON PASSENGER BUSSES

[76] Inventor: Jay D. Abbott, Rte. 3, Box 180, Rocky Mount, Va. 24151

[21] Appl. No.: 488,682

[22] Filed: Jun. 8, 1995

[51] Int. Cl.⁶ .................................................... B60R 7/04
[52] U.S. Cl. .................. 296/198; 296/37.7; 224/311; 312/327; 49/398
[58] Field of Search .................. 296/178, 37.7, 296/37.8; 312/326–328, 319.2, 245; 49/381, 386, 398; 105/325; 224/311; 244/118.5

[56] References Cited

U.S. PATENT DOCUMENTS

| | | | |
|---|---|---|---|
| 3,213,484 | 10/1965 | Epple | 49/398 X |
| 4,185,415 | 1/1980 | LaConte | 49/248 |
| 4,383,392 | 5/1983 | LaConte | 49/205 |
| 4,971,382 | 11/1990 | Ohno | 49/386 X |
| 5,327,682 | 7/1994 | Holtz | 49/398 X |
| 5,347,434 | 9/1994 | Drake | 244/118.5 X |
| 5,395,074 | 3/1995 | Hart et al. | 244/118.5 X |

FOREIGN PATENT DOCUMENTS 3630408  3/1988  Germany ................................ 224/311

Primary Examiner—Dennis H. Pedder
Attorney, Agent, or Firm—Donavon Lee Favre

[57] ABSTRACT

An door for an overhead rack of a luggage compartment of a bus is hinged on a bracket which extends downwardly from the ceiling of the bus. When the door is opened it rolls around the pivot away from the aisle and into the luggage compartment. The door is held in the open position by a compression spring until closed and latched. The door-hinge combination is particularly suited for retrofitting old busses which were constructed with open luggage racks. The old busses were unsafe because items in the storage racks could fall on passengers in case of accident or emergency movement of the bus.

11 Claims, 3 Drawing Sheets

RETROFITTED DOOR FOR OPEN LUGGAGE RACK ON PASSENGER BUSSES

FIELD OF THE INVENTION

This invention is directed to retrofitting the overhead luggage racks of used passenger busses with overhead doors.

DESCRIPTION OF THE PRIOR ART

Historically, passenger busses were constructed with open overhead luggage racks for carry on luggage and other carry on items. New model busses now have doors on the overhead luggage racks. The doors are hinged with common hinges, and held open by a gas spring on one side only. When opened the entire width of the door extends from the hinge into the space above the seats and the narrow passenger walkway space. To prevent interference in the walkway space the width of the door must be short or the width of the overhead storage space must me short, thus limiting the capacity of the overhead compartments. The frame work holding the gas spring is quite extensive, extending across the fiat width of the shelve, quite wide on the upwardly extending portion, then extending rearwardly at the top into the storage compartment. The door is made from plastic having a thickness of 0.060 inches. The overhead compartment doors on the new busses have a tendency to crack, and when they crack must be replaced. While the size of the storage compartments in the new busses may be satisfactory for local bus lines, long distance tour busses that travel to far parts of the United States, Mexico and Canada require larger storage compartments because passengers carry on more clothing and equipment for scenic hiking, sightseeing and photo jaunts along the way.

U.S. Pat. No. 4,185,415 LaConte (1980) discloses an articulated hinge having a movable pivot axis which cooperates with an energy storage device for automatically opening and securing an unlatched compartment door in a first open position. Primary and secondary linking members are rotatively mounted to a support structure adjacent the interior of the compartment door opening, and are also rotatively mounted on a hinge base member. The hinge base member forms a pivot axis about which the compartment door is mounted for rotation. A coupling member is associated with the compartment door and the primary and secondary linking members. When the compartment door is rotated, the coupling member causes the primary and secondary linking members to rotate about their attachment points to the support structure and thereby causes the pivot axis of the compartment door to move along a predetermined path. The energy storage device is associated with the binge base member and the compartment door and is capable of exerting a force on the compartment door to urge the compartment door to move from a closed position to a first open position and to maintain the compartment door in the first open position.

U.S. Pat. No. 4,383,392 LaConte (1983) discloses a hinge mechanism for an overhead baggage compartment which is generally located in the passenger section of an airliner. The hinge mechanism comprises, a dual-cam guided four-bar linkage mechanism which produces a compound motion to the door for retraction through a relatively narrow horizontal opening into an area above the baggage compartment. Ordinarily, a four-bar linkage mechanism would have its operation designed around two fixed pivot points; however, in this disclosure there is only one fixed pivot point and the other of said pivots is a walking pivot which is guided by a dual-cam device for profiling the travel of the door.

SUMMARY OF THE INVENTION

The present invention is directed primarily to a method of retrofitting a used bus having an open overhead luggage compartment, formed by a shelve and a top, with doors which form a seal between the luggage shelve and the top of the compartment to prevent goods stored thereon from falling on and injuring passengers. This is accomplished by attaching an upwardly extending support member to the shelve on each side of a section of the open overhead luggage compartment where each door is to be positioned. Attaching a downwardly extending support member to the top of the compartment on each side of where each door is to be positioned. Positioning a door hinge at an upper end of each upwardly extending support member and a downwardly extending support member on each side of where each door is to be positioned, and mounting a door on the two hinges to cover the section of the open overhead luggage compartment. By positioning the hinges on brackets below the top of the compartment, the door swings into the compartment when it is opened thereby providing more room in the aisle of the bus for the passenger to move when the passenger is putting luggage into the compartment or taking it out. On a tour bus making frequent stops, this is an added convenience.

In order to reduce stress on the door when it is opened and closed a compression spring is mounted between each upwardly extending support member and each hinge. The compression springs are used to bias the door in an open position. A latch is placed on the door and a latch catch is attached to the shelve to maintain the door in a closed position until unlatched.

Tour busses are often old, restored passenger busses. A particularly good candidate for restoration is the Model MC 9 Motor Coach Industries bus.

The overhead compartment having a hinged door and a latch closure of the present invention comprises a bracket extending downwardly from the roof of the compartment at each end of the door, a corresponding bracket extending from the top inner surface at each end of the door, and a hinge positioned between the roof bracket and the door bracket at each end of the door. With this configuration when the door is opened the top edge of the door swings into the overhead compartment leaving more space in an aisle adjacent the passenger compartment for a passenger to move. A compression spring is preferably positioned between each door bracket and a corresponding position fixed with relationship to the compartment to maintain the door in an opened positioned while unlatched. The door is preferably formed of plastic having a thickness of at least 0.1 inches. The bracket extending downwardly from the roof extends downwardly at an angle of from 45° to 90°. Preferably the bracket extends downwardly from one half inch to three inches and the hinge is positioned one fourth to two and one half inches from the top of the bracket. Preferably the hinged door of the present invention is installed in a model MC 9 Motor Coach Industries bus.

DESCRIPTION OF THE PREFERRED EMBODIMENT

Figure 1:
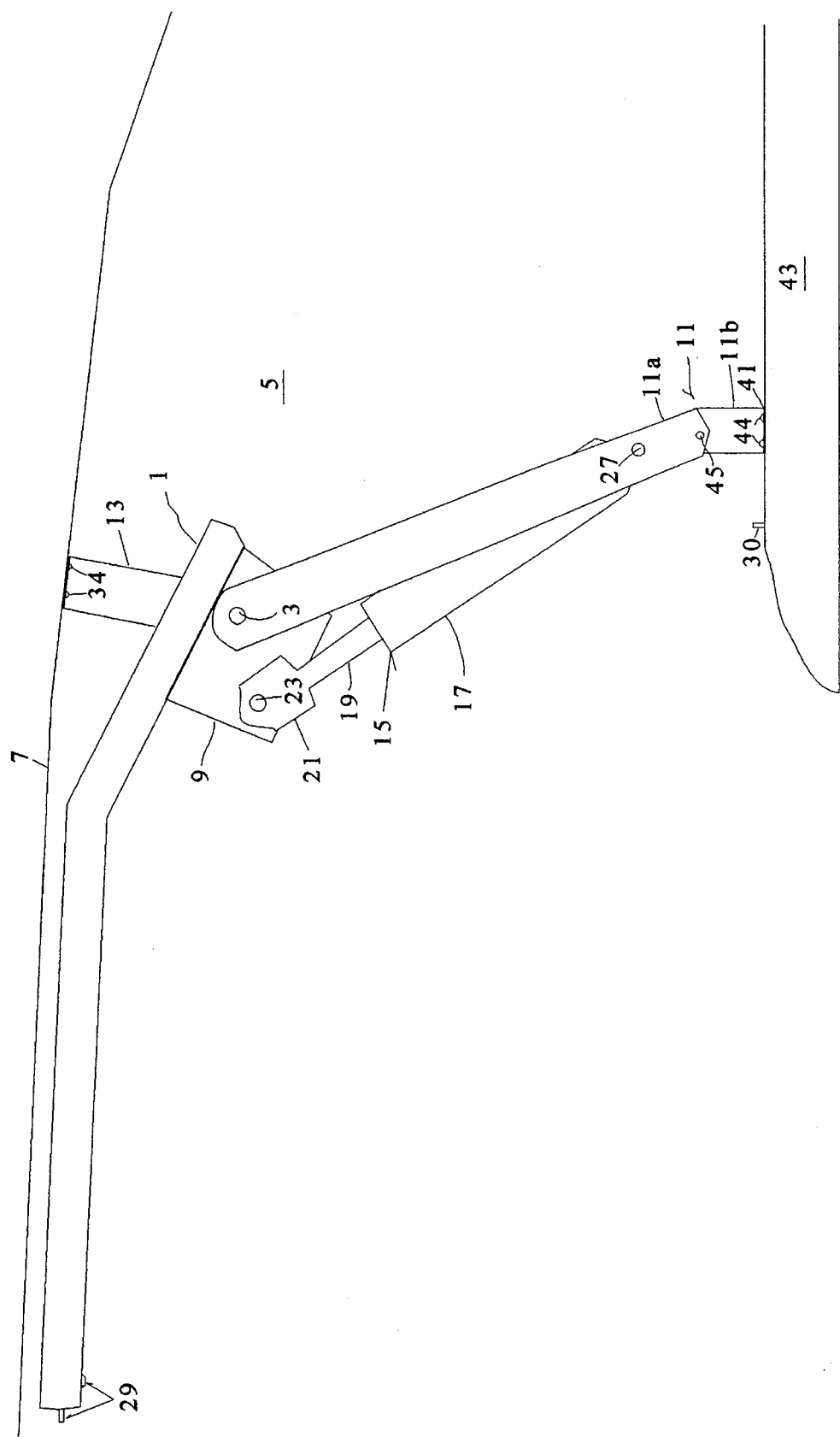
FIG. 1 is a side view of the apparatus of the present invention wherein the compartment door is in an open position.
Figure 2:
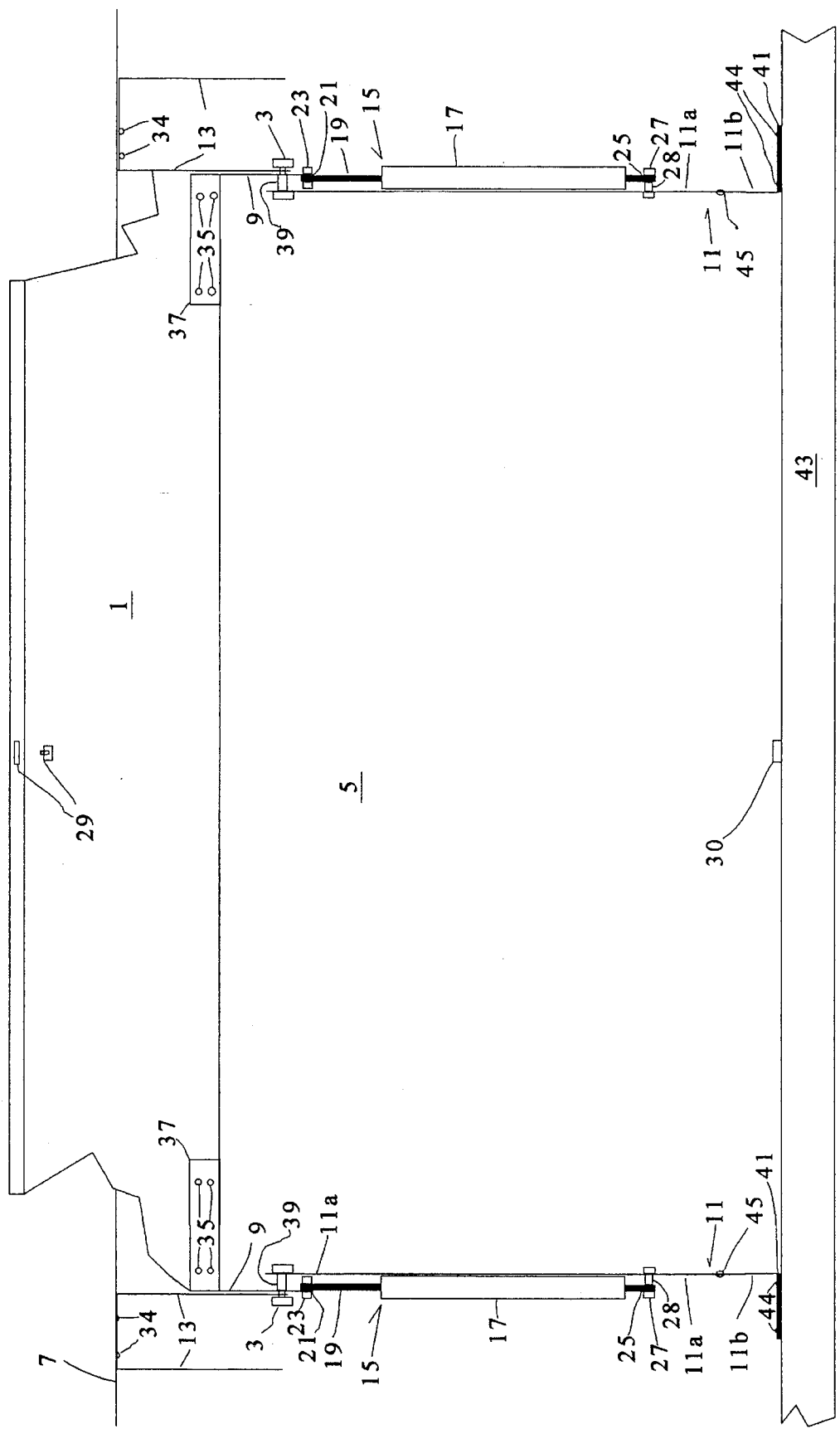
FIG. 2 is a front view facing the compartment of the apparatus of the present invention wherein the compartment door is in an open position.
Figure 3:
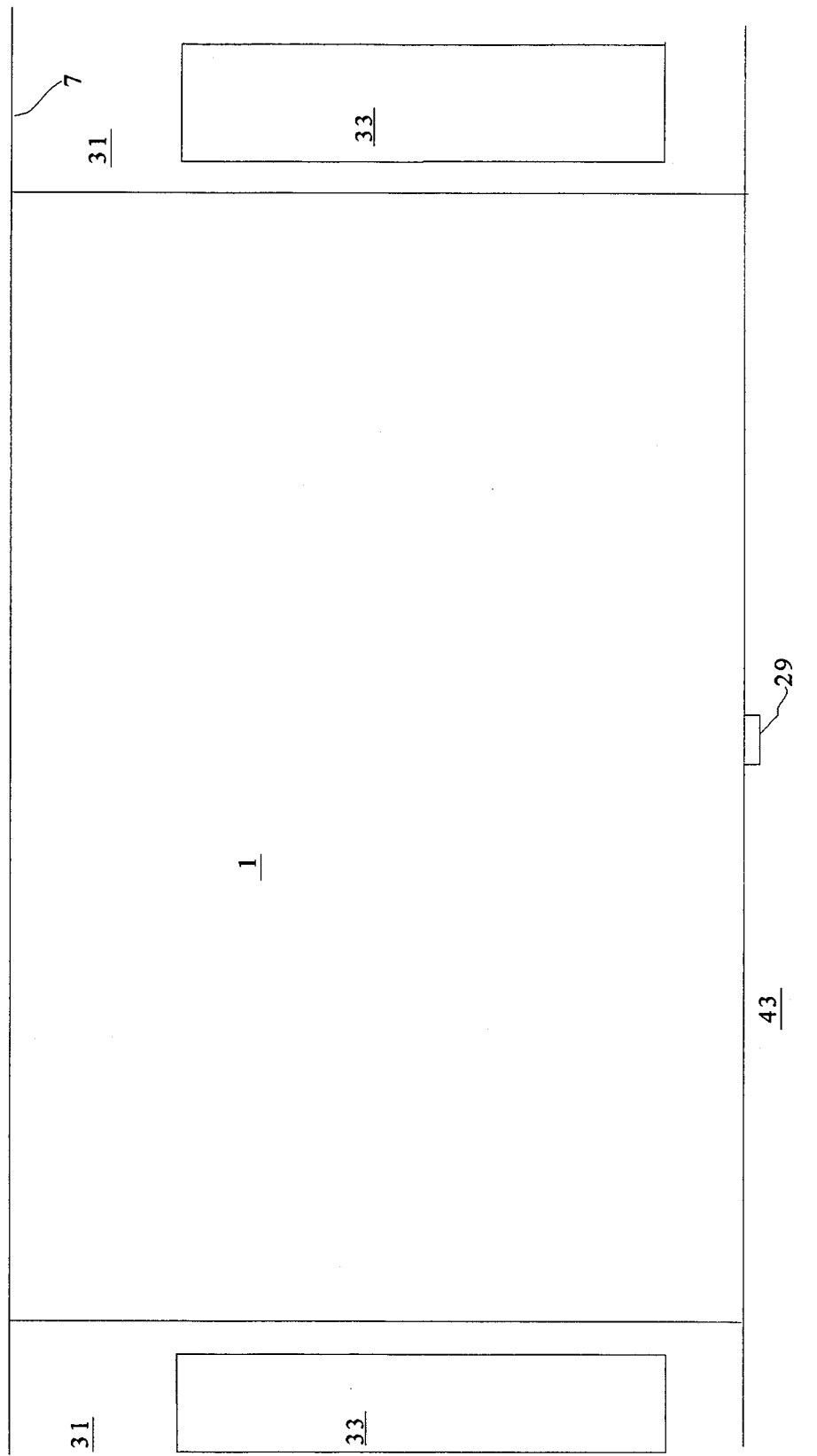
FIG. 3 is a front view of the apparatus of the present invention wherein the compartment door is in a closed position.

FIGS. 1 through 3 illustrate the preferred embodiment of this invention when used in conjunction with an overhead compartment of a bus. As is best shown in FIG. 1, the overhead compartment door 1 rotates about sleeved hinge pivot bolt 3 and moves a small distance into overhead compartment 5. At the same time, the part of the overhead compartment door 1 remaining above the aisle of the bus, moves upward toward the bus ceiling 7 and away from the passenger aisle. Door 1 is mounted on hinge rotation plate 9. Hinge rotation plate 9 is supported by hinge bolt 3. Hinge bolt 3 is supported from below by upwardly extending bracket 11 and from above by downwardly extending bracket 13. Hinge rotation plate 9 is spring loaded to an open position of compartment door 1 by a compression spring 15. Preferably the compression spring is a gas spring 15 that exerts an opening and hold open force on the hinge rotation plate 9, and includes a cylinder 17, an axial piston rod 19 extending through the end of the cylinder 17, and a piston (not shown), slidable within the cylinder 17 and affixed to the end of the piston rod 19.

Fastening flange 21 is positioned on the end of piston rod 19. Fastening flange 21 is mounted for rotation adjacent the front outer edge of hinge rotation plate 9 on connecting bolt 23 which extends through a sleeved opening in hinge rotation plate 9. A second fastening flange 25 (see FIG. 2) is affixed to and projects downwardly from cylinder 17. The second fastening flange 25 is fitted with a sleeved opening and is mounted for rotation on bolt 27 which extends through a sleeved opening in upwardly extending bracket 11 and a spacer 28.

The biasing force exerted by the gas spring 15 on the compartment door 1 to urge the door a to its open position is dependent upon the moment arm defined by the distance between the center of attachment of hinge bolt 3 and the center of attachment of connecting bolt 23. The door 1 is held closed against the biasing force by a conventional latch 29 which cooperates with latch catch 30.

A refurbished bus in its final form contains a row of compartment doors 1 on each side of the passenger aisle. A closed compartment is shown in FIG. 3. Compartment doors 1 alternate with light fixtures 31 containing lights 33. Behind each light fixture is a U shaped bracket 13 which serves to support two hinge plates 9 of adjacent doors 1.

In the practice of the present invention a well used Motor Coach Industries model MC 9 bus which was originally built with open luggage racks was restored and customized with various features including a luggage rack door. Downwardly extending U shaped brackets 13 were attached to the upper surface of a luggage rack at spaced intervals with fasteners 34, the space between the two U shaped brackets 13 corresponding to the length of door 1. Hinge rotation plates 9 were attached to each end of door 1 by screws 35 through flanges 37 which are integral with hinge rotation plates 9 and extend from hinge rotation plates 9 at a 90° degree angle. Fastening flanges 21 were attached to rotation plates 9 by connecting bolts 23 which extends through a sleeved opening in fastening flanges 21 on each side of door 1. The other end of gas spring 15 was attached to upwardly extending bracket 11 by bolt 27 which extends through a sleeved opening in fastening flange 25 on each side of door 1. Hinge pivot bolts 3 were inserted through openings in downwardly extending brackets 13, spacers 39 and upwardly extending brackets 11 on each side of door 1. Flanges 41 which extend at fight angles from the bottom of upwardly extending support brackets 11 and are integral with the brackets 11 were then attached to shelve 43 with fasteners 44. Upwardly extending bracket 11 consists of two bracket segments, 11a and 11b which are joined by a screw 45. The screw 45 when loose allows the angle between 11a and 11b, and hence the length of 11 to be varied to compensate for variations in the distance between the shelve 43 and the ceiling of the bus 7. After the proper angle is established screw 45 is tightened preventing any further movement between 11a and 11b.

I claim:

1. A method of retrofitting a used bus having an open overhead luggage compartment, formed by a shelve and a top, with doors having a top edge in the closed position which form a seal between the luggage shelve and the top of the compartment to prevent goods stored thereon from failing on and injuring passengers comprising:

attaching an upwardly extending support member to the shelve on each side of a section of the open overhead luggage compartment where each door is to be positioned, attaching a downwardly extending support member to the top of the compartment on each side of where each door is to be positioned, positioning a door hinge at an upper end of each upwardly extending support member and at a lower end of each downwardly extending support member on each side of where each door is to be positioned, mounting a door on the two hinges positioned downwardly from the top edge of the door to cover the section of the open overhead luggage compartment whereby when the door is opened the top edge of the door swings into the overhead compartment leaving more space in an aisle adjacent the passenger compartment for a passenger to move.

2. The method of claim 1 further characterized by mounting a compression spring between each upwardly extending support member and each hinge to bias the door in an open position.

3. The method of claim 1 further characterized by positioning a latch on the door and a latch catch on the shelve to maintain the door in a closed position until unlatched.

4. The method of claim 1 wherein the bus is a model MC 9 Motor Coach Industries bus.

5. In an overhead storage compartment of a bus, the overhead compartment having a roof, a shelve, a hinged door and a latch closure, the improvement comprising an upper bracket extending downwardly from the roof of the compartment and a lower bracket extending upwardly from the shelve at each end of the door, a door bracket extending from a top inner surface at each end of the door, and a hinge positioned at least one fourth inch below a top of the door bracket and inwardly from the door between the upper bracket and the door bracket at each end of the door, whereby when the door is opened the top edge of the door swings into the overhead compartment leaving more space in an aisle adjacent the passenger compartment for a passenger to move.

6. The hinge of claim 5 further characterized by a compression spring positioned between each door bracket and each lower bracket to maintain the door in an opened positioned while unlatched.

7. The storage compartment of claim 5 further characterized by the door being formed of plastic having a thickness of at least 0.1 inches.

8. The storage compartment of claim 5 wherein the bracket extending downwardly from the roof extends downwardly at an angle of from 45° to 90°.

9. The storage compartment of claim 8 wherein the last named bracket extends downwardly from one half inch to three inches and the hinge is positioned one fourth to two and one half inches from the top of the last name bracket.

10. The storage compartment of claim 5 wherein the bus is a model MC 9 Motor Coach Industries bus.

11. In an overhead storage compartment of a bus, the overhead compartment having a roof, a shelve, a hinged door and a latch closure, the improvement comprising an upper bracket extending downwardly from the roof of the compartment and a lower bracket extending upwardly from the shelve at each end of the door, a door bracket extending from a the top inner surface at each end of the door, and a hinge positioned one fourth to two and one half inches below a top of the door bracket and inwardly from the door between the upper bracket and the door bracket at each end of the door, whereby when the door is opened the top edge of the door swings into the overhead compartment leaving more space in an aisle adjacent the passenger compartment for a passenger to move.

* * * * *